April 22, 1969
KUANG-WEI G. WU ET AL
3,440,487
LIGHTING SYSTEM FOR MOTOR VEHICLE
Filed Dec. 27, 1965
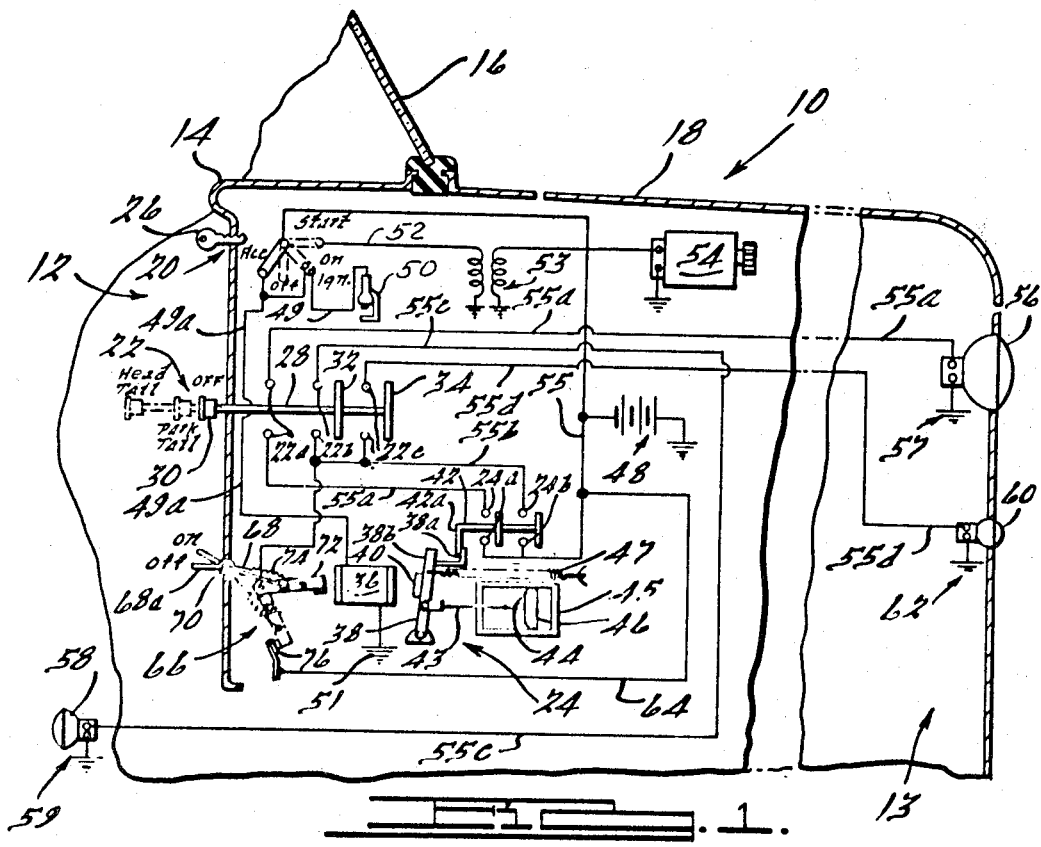
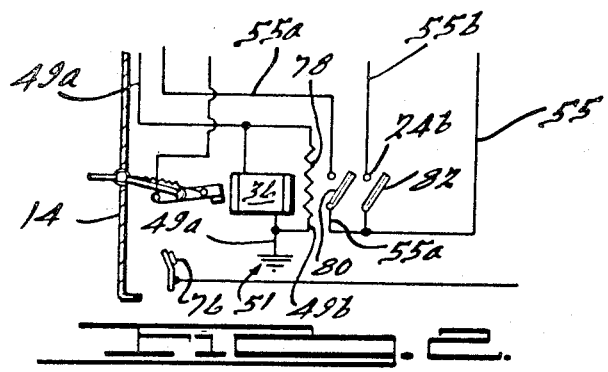
INVENTORS
Kuang-Wei George Wu
Charles E. Wontrobski
BY
Harness and Harris
ATTORNEYS

United States Patent Office 3,440,487
Patented Apr. 22, 1969

3,440,487
LIGHTING SYSTEM FOR MOTOR VEHICLE
Kuang-Wei G. Wu and Charles E. Wontrobski, Detroit, Mich., assignors to Chrysler Corporation, Highland Park, Mich., a corporation of Delaware
Filed Dec. 27, 1965, Ser. No. 516,430
Int. Cl. B60q 1/04
U.S. Cl. 315—77                6 Claims

ABSTRACT OF THE DISCLOSURE

An automatic headlight cutoff device wherein a solenoid actuated time delay switch in series relation with the headlights is de-energized in response to turning off the ignition switch and thereafter functions to break the headlight circuits a predetermined length of time after such de-energization. The device also includes provision to maintain at least some of the vehicle lights on indefinitely irrespective of the operation of the time delay switch as well as provision to extinguish certain lights after a time delay while allowing other lights to remain on indefinitely.

---

This invention relates to a lighting system for a motor vehicle. More particularly, it relates to a control system for the exterior lights of a motor vehicle.

It is an object of the present invention to provide an improved lighting system for a motor vehicle.

A more specific object is to provide an improved control system for the exterior lights of a motor vehicle.

A yet more specific object is to provide a control system that will extinguish the exterior lights automatically if they are left on through operator oversight.

Another object is to provide such a control system that also affords a time delay between actuation of the control device and extinction of the exterior lights.

Another object is to provide a control system that affords such a time delay when desired but which also allows at least some of the exterior lights to remain illuminated indefinitely at the operator's option.

Yet another object is to provide an exterior lighting control system that will provide automatic, delayed extinction of selected exterior lights while maintaining selected other exterior lights indefinitely illuminated.

These and other objects, features and advantages of the invention will be apparent from the following detailed description of a preferred embodiment of the invention and from the accompanying drawing wherein:

FIG. 1 is a fragmentary schematic view of a motor vehicle embodying a vehicle lighting system according to the invention; and FIG. 2 is a schematic view showing a modified form of that portion of the lighting system circuitry of FIG. 1 within the dotted circle.

The motor vehicle seen fragmentarily in FIG. 1 includes a vehicle body 10 defining a passenger or operator's compartment 12 and an engine compartment 13. Body 10 includes an instrument panel 14, windshield 16, and hood 18.

An ignition switch 20 and a light switch 22 are mounted on instrument panel 14 so as to be accessible to an operator situated within passenger compartment 12. An auxiliary or relay switch 24 is positioned behind panel 14.

Ignition switch 20 is of known form and will be understood to be movable between "on," "off," "accessory" and "start" positions by selective turning movement of key 26.

Light switch 22 is of known form and includes a rod 28 capped by a knob 30 and carrying a pair of spaced transverse conductor bars 32, 34. Bars 32, 34 coact selectively with contact pairs 22a, 22b, 22c as rod 28 is moved axially by manipulation of knob 30.

Relay switch 24 includes a coil 36, a lever 38 carrying an armature 40, and a rod 42 carrying a pair of spaced conductor bars for selective coaction with contact pairs 24a, 24b. A piston rod 43 connects at one end to lever 38 and at its other end to a piston 44 moving slidably in a dashpot 45 filled with oil or other fluid. Piston 44 includes a hinged door or check valve 46 which swings open to allow free flow of fluid from the left to the right side of piston 44 and swings closed to preclude flow of fluid from the right to the left side of piston 44 except through a small bleed hole (not shown) in door 46. A return spring 47 continuously urges lever 38 in a direction away from coil 36.

A battery 48 provides a source of electrical energy for the electrical system of the motor vehicle. As is typical, the electrical system includes an ignition circuit, a starting circuit and a lighting or illuminating circuit.

The ignition circuit is defined by conductor means 49 extending from the battery 48 to ignition switch 20 and thence from the "on" or "ignition" terminal of switch 20 to igniter means 50 for the prime mover of the motor vehicle. It will be understood that where the prime mover comprises an internal combustion engine, igniter means 50 comprises one or more spark plugs. Conductor means 49 also defines a branch circuit 49a extending from ignition switch 20 to coil 36 and thence to ground at 51.

The starting circuit is defined by conductor means 49 and by conductor means 52 extending from the "start" terminal of ignition switch 20 to transformer 53 and thence to starter 54.

The lighting or illuminating circuit is defined by conductor means 55. Conductor means 55 extends from battery 48 to auxiliary switch 24 where it splits to form parallel circuits 55a, 55b passing respectively through contact pairs 24a, 24b. Circuit 55a thereafter passes through contact pair 22a of light switch 22 and thence to a headlamp 56 carried on vehicle body 10 adjacent the forward end of the latter. Circuit 55a is ground at 57.

Circuit 55b extends from auxiliary switch 24 to light switch 22 where it splits to form parallel circuits 55c, 55d passing respectively through contact pairs 22b, 22c. Circuit 55c thereafter extends to a tail lamp 58 carried on the rearward end of vehicle body 10 and thence to ground at 59. Circuit 55d extends from switch 22 to a parking lamp 60 carried on the forward end of vehicle body 10 and thence to ground at 62.

To operate the lighting system of the invention it is necessary that the ignition switch 20 be either in its "on" (or "ignition") position or in its "accessory" position. Movement of switch 20 to its "on" position or "accessory" position connects circuit 49a to battery 48 and thereby energizes coil 36 to attract armature 40 and lever 38. As lever 38 moves toward coil 36, arm portion 38a of lever 38 picks up arm portion 42a of rod 42 to close contact pairs 24a, 24b. This movement of lever 38 is virtually unimpeded by dashpot 45 since vent door 46 hinges open to allow free transfer of fluid from the left to the right side of piston 44. If light switch 22 is now pulled out to its first notch or "PARK-TAIL" position, conductor bars 32, 34 respectively bridge or close contact pairs 22b, 22c to illuminate tail lamp 58 and parking lamp 60. When switch 22 is pulled out to its second notch or "HEAD-TAIL" position, conductor bars 32, 34 respectively bridge or close contact pairs 22a, 22b, whereby to extinguish parking lamp 60, illuminate head lamp 56, and continue to illuminate tail lamp 58.

If the operator desires to extinguish the exterior lights immediately upon leaving the motor vehicle, light switch 22 may be pushed into its "off" position. If, however, the operator desires to have the exterior lights remain illuminated for a predetermined period of time after leaving the motor vehicle, the light switch may be left in either its "HEAD-TAIL" or "PARK-TAIL" position. When the ignition switch is thereafter turned to its "off" position upon leaving the motor vehicle, coil 36 is immediately de-energized. Lever 38 is now moved away from coil 36 by return spring 47. This movement is only very slow, however, since valve or door 46 now assumes a closed position to allow only a slow, controlled flow of fluid to pass through the bleed hole in door 46. After a predetermined amount of movement of lever 38 away from coil 36, lever arm portion 38b picks up rod arm portion 42a to break contact pairs 24a and 24b and extinguish the exterior vehicle lights. The time required for this movement of lever 38, which may for example be one minute, may of course be selectively varied by selective variation of the several system parameters.

In the example above, the operator has been assumed to have intentionally left the light switch in an "on" position so as to provide light for a predetermined period of time after leaving the vehicle. The system functions in the same way, however, if the light switch has been left in an "on" position through inadvertence or oversight. The system thus precludes the possibility of the exterior lights being inadvertently left on with consequent drain on the battery.

Means are also provided according to the invention to allow the parking and tail lights to remain illuminated indefinitely irrespective of the aforesaid operation of time delay relay 24.

These means include a bypass circuit 64 and a hold switch 66 in circuit 64. Circuit 64 extends from a point on circuit 55 ahead of switch 24 to a point on circuit 55b after switch 24, whereby to provide a bypass around switch 24 for parking and tail light circuit 55b.

Hold switch 66 comprises an operating lever 68 pivoted at 70 on instrument panel 14 and a magnetic or armature lever 72 pivotally mounted behind panel 14. One end of operating lever 68 is pivotally connected to armature lever 72 and a coil spring 74 extends from point 70 to lever 72. The handle portion 68a of operating lever 68 is movable between an "off" position (seen in solid lines) in which bypass circuit 64 is broken and an "on" position (seen in phantom) in which a contact carried on the free end of armature lever 72 engages a contact 76 to complete bypass circuit 64 through lever 72. Spring 74 provides a positive snap action to the switch os it is moved over-center between its "on" and "off" positions.

When ignition switch 20 is in its "on" position, energized coil 36 attracts armature lever 72 to maintain it in its open or circuit breaking position. If it is desired to leave the parking and/or tail lights illuminated when leaving the car after turning off the ignition, as for example if the car is disabled alongside a highway, hold switch 66 is moved manually to its "on" position. If the light switch has been left in its fully on or "HEAD-TAIL" position, the headlamps will be extinguished after the expiration of the predetermined time delay but the tail lights will remain illuminated indefinitely by virtue of bypass circuit 64. If the light switch has been left in the partially on or "PARK-TAIL" position, bypass circuit will function to maintain both the parking and the tail lights illuminated indefinitely.

In either event, when the operator returns to the motor vehicle and turns on the ignition switch, hold switch 66 will be moved automatically to its "off" position by the magnetic action of coil 36 on armature lever 72. This automatic return of switch 66 to its "off" position ensures that the parking and tail lights will not remain illuminated indefinitely when the operator, seeking to take advantage of the delayed illumination feature, next leves the vehicle with the light switch on.

In the modified form of lighting system circuitry shown in FIG. 2, lever 38 and dashpot 45 are replaced with a heater comprising a resistance 78 provided in a circuit 49b connected in parallel to coil 36, and rod 42 is replaced with a pair of bimetal switch members 80 and 82. Bimetals 80 and 82 have cold positions, as shown, breaking circuits 52a and 52b. When heated, the differential expansion bows them to position closing their respective circuits. One of the metals of each bimetal is a magnetic metal so that when ignition switch 20 is turned on to energize coil 36 bimetals 80, 82 move instantly to their circuit closing positions without need for warm-up time. Accordingly, the exterior lights may be turned on immediately by pulling out light switch 22.

After a short period of use, heater 78 will heat up bimetals 80, 82 so that the bimetals are thereafter maintained in their closed position by the warping action of the differential expansion, irrespective of the magnetic action of coil 36. Thus when the ignition switch is thereafter turned off preparatory to leaving the motor vehicle and the light switch is left, either intentionally or inadvertently, in an "on" position, the bimetals will remain in their closed position until they have had time to cool, whereupon they will move to their circuit breaking positions to extinguish the exterior lights. The cooling time for bimetals 80, 82 thus determines the time lapse or delay between turning off the ignition switch and extinction of the exterior lights. The remainder of the lighting system of FIG. 2 is identical to the previously described system of FIG. 1.

While a preferred embodiment of the invention has been illustrated and described in detail, it is to be understood that various changes may be made in the disclosed embodiment without departing from the scope or spirit of the invention as defined by the appended claims.

We claim:
1. In a motor vehicle of the type including:
 (A) a vehicle body defining a passenger compartment;
 (B) a prime mover; and
 (C) an electrical system including
  (1) a source of electrical energy,
  (2) an ignition system for said prime mover including an ignition switch accessible to an operator positioned within said compartment and having an on position and an off position,
  (3) an illuminating system including
   (a) at least one lamp carried on said body adjacent the forward end of the latter,
   (b) conductor means establishing an electrical circuit including said electrical energy source and said lamp, and
   (c) a light switch accessible to said operator and having an on position completing said circuit and an off position breaking said circuit:
the improvement wherein said electrical further includes
 (D) an auxiliary switch in said circuit having an open position breaking said circuit and a closed position closing said circuit;
 (E) means operative in response to movement of said ignition switch from its off position to its on position to close said auxiliary switch; and
 (F) means operative in response to movement of said ignition switch to its said off position to open said auxiliary switch a predetermined length of time after such movement whereby to extinguish said lamp after said predetermined time.

2. A motor vehicle according to claim 1 wherein said illuminating system also includes:
 (A) further conductor means establishing a bypass circuit interconnecting a first point on said circuit between said source and said auxiliary switch and a second point on said circuit between said auxiliary switch and said light switch, and
 (B) a manually operable switch accessible to said operator and having a closed position completing said bypass circuit and as open position breaking said bypass circuit, whereby
(1) when said light switch is moved to its off position said lamp will be immediately extinguished irrespective of the position of said manually operable switch,
(2) when said light switch is left in its on position and said manually operable switch in its off position said lamp will be extinguished said predetermined length of time after movement of said ignition switch to its off position, and
(3) when said light switch is left in its on position and said manually operable switch in its on position said lamp will remain illuminated indefinitely irrespective of movement of said ignition switch to its off position.

3. A motor vehicle according to claim 1 wherein:
(A) said illuminating system further includes at least one auxiliary lamp;
(B) said circuit includes
   (1) a first portion connecting said one lamp to said electrical energy source and
   (2) a second portion in parallel with said first portion and connecting said auxiliary lamp to said electrical energy source;
(C) said auxiliary switch closes and breaks both portions of said circuit simultaneously as it is moved between its aforesaid positions; and
(D) said illuminating system also includes
   (1) further conductor means establishing a bypass circuit interconnecting points on said second circuit portion at opposite sides of said auxiliary switch and
   (2) a manually operable switch accessible to said operator, having a closed position completing said bypass circuit and an open position breaking said bypass circuit, whereby said light switch may be left in its on position and said manually operable switch in its closed position so that upon movement of said ignition switch to its off position said one lamp will be extinguished said predetermined length of time thereafter while said auxiliary lamp will remain illuminated indefinitely.

4. A motor vehicle according to claim 2 and further including means operative in response to movement of said ignition switch to its said on position to move said manually operable switch to its said off position.

5. A motor vehicle according to claim 3 and further including means operative in response to movement of said ignition switch to its said on position to move said manually operable switch to its said off position.

6. In a motor vehicle of the type including:
(A) a vehicle body defining a passenger compartment; and
(B) an electrical system including
   (1) a source of electrical energy and
   (2) an illuminating system comprising
      (a) at least one lamp carried on said vehicle body,
      (b) a light switch accessible to said operator and having an on position and an off position,
      (c) conductor means establishing a lighting circuit including said electrical energy source and said lamp, and
      (d) time delay means, including a first manually operable switch accessible to an operator situated within said compartment and having an on position and an off position, operative in response to movement of said switch from its on positon to its said off position to break said circuit a predetermined length of time after the aforesaid movement of said switch:
the improvement wherein said electrical system further includes
(C) holding means, including a second manually operable switch in series relation with said light switch accessible to said operator and having and on position and an off position, operative with said second switch in its said on position to maintain said lamp illuminated indefinitely irrespective of movement of said first switch to said off position; and
(D) means operative in response to movement of said first manually operable switch to its said on position to move said second manually operable switch to its said off position.

References Cited

UNITED STATES PATENTS 2,770,687  11/1956  Morrow ---------- 315—82 X
2,806,980  9/1957   Shapiro ---------- 315—83

JAMES W. LAWRENCE, *Primary Examiner.*

P. C. DEMEO, *Assistant Examiner.*

U.S. Cl. X.R.

315—82